US011474267B2

(12) United States Patent
Xiao (10) Patent No.: US 11,474,267 B2
(45) Date of Patent: Oct. 18, 2022

(54) COMPUTER-IMPLEMENTED METHOD AND SYSTEM EMPLOYING COMPRESS-SENSING MODEL FOR MIGRATING SEISMIC-OVER-LAND CROSS-SPREADS (71) Applicants: China Petroleum & Chemical Corporation, Beijing (CN); Sinopec Tech Houston, Houston, TX (US)

(72) Inventor: Xiang Xiao, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 245 days.

(21) Appl. No.: 16/898,666

(22) Filed: Jun. 11, 2020

(65) Prior Publication Data
US 2021/0389485 A1 Dec. 16, 2021

(51) Int. Cl.
*G01V 1/28* (2006.01)
*G01V 99/00* (2009.01)
*G01V 1/36* (2006.01)

(52) U.S. Cl.
CPC .............. *G01V 1/282* (2013.01); *G01V 1/364* (2013.01); *G01V 99/005* (2013.01); *G01V 2210/512* (2013.01); *G01V 2210/671* (2013.01)

(58) Field of Classification Search
None
See application file for complete search history.

(56) References Cited

U.S. PATENT DOCUMENTS

| 5,274,605 A | 12/1993 | Hill |
| 5,530,679 A | 6/1996 | Albertin |
| 5,629,904 A | 5/1997 | Kosloff |
| 7,480,206 B2 | 1/2009 | Hill |
| 7,561,493 B2 | 7/2009 | Ray |
| 7,668,047 B2 | 2/2010 | Ray |
| 7,724,607 B2 | 5/2010 | Ray |

(Continued)

FOREIGN PATENT DOCUMENTS

CN     101073020 A  * 11/2007  ............. G01V 1/282

OTHER PUBLICATIONS

Dan Gordon, The Floating Column Algorithm for Shaded, Parallel Display of Function Surfaces without Patches, Article in IEEE Transactions on Visualization and Computer Graphics • Feb. 2002, vol. 8, No. 1, pp. 76-91.

(Continued)

*Primary Examiner* — Lina M Cordero
(74) *Attorney, Agent, or Firm* — Novick, Kim & Lee, PLLC; Allen Xue (57) ABSTRACT

A method and a system for implementing the method are disclosed wherein the seismic input data and land acquisition input data may be obtained from a non-flat surface, sometimes mild or foothill topography as well as the shot and receiver lines might not necessarily be straight, and often curve to avoid obstacles on the land surface. In particular, the method and system disclosed, decomposes the cross-spread data into sparse common spread beams, then maps those sparse beams into common-spread depth domain, in order to finally stack them to construct the subsurface depth images. The common spread beam migration and processing have higher signal to noise ratio, as well as faster turn-around processing time, for the cross-spread land acquisition over the common-shot or common offset beam migration/processing. The common spread beam migration method and system disclosed, will eventually help illuminate and interpret the hydro-carbonate targets for the seismic processing.

9 Claims, 5 Drawing Sheets

(56) References Cited

U.S. PATENT DOCUMENTS

| | | | |
|---|---|---|---|
| 8,116,168 B1 | 2/2012 | Luo | |
| 8,219,321 B2 | 7/2012 | Wang | |
| 8,326,543 B2 | 12/2012 | Nemeth | |
| 8,326,544 B2 | 12/2012 | Peng | |
| 8,406,081 B2 | 3/2013 | Xia | |
| 8,965,059 B2 | 2/2015 | Wimbow | |
| 9,013,956 B2 | 4/2015 | Hill | |
| 9,329,288 B2 | 5/2016 | Jin | |
| 9,366,771 B2 | 6/2016 | Dasgupta | |
| 9,488,743 B2 | 11/2016 | Ray | |
| 9,625,593 B2 | 4/2017 | Neelamani | |
| 10,045,455 B2 | 8/2018 | Ray | |
| 10,261,206 B2 | 4/2019 | Liu | |
| 10,360,317 B2 | 7/2019 | Hill | |
| 2005/0088913 A1* | 4/2005 | Lecomte | G01V 1/282 367/51 |
| 2011/0096627 A1* | 4/2011 | Hill | G01V 1/282 367/73 |
| 2011/0103187 A1* | 5/2011 | Albertin | G01V 1/28 367/73 |
| 2015/0253443 A1* | 9/2015 | Hornbostel | G01V 1/30 367/15 |
| 2021/0149066 A1* | 5/2021 | Wu | G01V 1/005 |
| 2021/0208295 A1* | 7/2021 | Padhi | G01V 1/303 |

OTHER PUBLICATIONS

Sammuel H Gray, Gaussian beam migration of common-shot records, Geophysics, vol. 70, No. 4 (Jul.-Aug. 2005); p. S71-S77, 6 FIGS, doi 10.1190/1.1988186.

Robert L. Nowack, Focused Gaussian Beams for Seismic Imaging, Article in SEG Technical Program Expanded Abstracts • Jan. 2008, Dept. of Earth and Atmos. Sci., Purdue University.

Samuel H Gray et al., Taking apart beam migration, Article in The Leading Edge • Sep. 2009, Special Edition Beam Migration, pp. 1098-1108.

Lorenzo Casasanta and Samuel H Gray, Converted-wave beam migration with sparse sources or receivers, CGG, 715 5th Avenue SW, Calgary, AB T2P 5A2 Canada, Received Apr. 2014, revision accepted Oct. 2014, Geophysical Prospecting, 2015 doi: 10.1111/1365-2478.12226.

Samuel H Gray et al., Imaging using multi-arrival: Gaussian Beams or multi-arrival Kirchhoff, Colorado School of Mines, Golden, CO, USA, 2002, SEG International Exposition and 72nd Annual Meeting, Salt Lake City, UT, https://doi.org/10.1190/1.1816843.

* cited by examiner

COMPUTER-IMPLEMENTED METHOD AND SYSTEM EMPLOYING COMPRESS-SENSING MODEL FOR MIGRATING SEISMIC-OVER-LAND CROSS-SPREADS

TECHNICAL FIELD

The present disclosure generally relates to migrating seismic data using cross-spread land acquisition geometry, in particular using common spread beam migration for illuminating and interpreting subsurface hydro-carbonate targets for post seismic processing.

BACKGROUND OF INVENTION

1. Introduction

Exploration seismology aims at revealing the accurate location and amplitude of a target hydro-carbonate within a subsurface, from the prestack seismic data acquired at the earth surface. It uses artificially generated elastic waves to locate mineral deposits (including hydrocarbons, ores, water, geothermal reservoirs, etc.), archaeological sites, and to obtain geological information for post-processing applying physics and geology concepts, to obtain information about the structure and distribution of rock types. Usually, seismic exploration projects are done with a business goal in mind and, hence, cost-benefit is an ever-present concern. Nevertheless, seismic methods used during exploration alone cannot be used to determine many of the features that make a project profitable and, even when supplemented by other data, a unique method for processing the information is evident. Seismic exploration usually stops long before unambiguous answers are obtained and before all has been learned that might possibly be learned, because in the judgment of a person's having ordinary skills in the art, further information is better obtained in some other way, such as by drilling a well. As such, seismic methods are in continual economic competition with other methods. Nevertheless, almost all oil companies rely on seismic interpretation for selecting the sites for exploratory oil wells. Despite the indirectness of any the exploration methods used, the likelihood of a successful exploration project is significantly improved if certain known techniques are used in combination with project specific techniques, especially given the enormous amount information produced by 3-D techniques and computing processing power. This is due to the fact, that most receiving systems like geophones or hydrophones display two-dimensional or three-dimensional seismic "time sections", each consisting of large numbers of seismic traces. Although visual inspection of these seismic time sections can intuitively suggest shapes and locations of subsurface reflecting formations, the land acquisition input data may be inaccurate or misleading even to a person having ordinary skills in the art therefore leading to erroneous conclusions as to the actual shapes and locations of subsurface matters. Accordingly, recorded seismic data is usually manipulated for the purposes of producing migrated sections that depict the proper spatial locations of subsurface matter.

2. Recording Seismic and Land Acquisition Input Data

Geophysicists and exploration teams use controlled charges of dynamite or vibroseis trucks for onshore exploration, while airguns are used offshore explorations in order to release waves of sound into the earth. The waves of sound generated by either of these methods, vibrate underground and bounce back to the surface which instead are received on a receiving device placed in a specific pattern across the terrain. Their number and placement patterns are dependent upon the design, cost, and size of the survey.

As waves of sound vibrate into the receiving system, they are recorded or saved to a memory resource, which are then displayed as sound patterns or "traces" of subsurface formations. The patterns of these wave generators and their recording devices create many complexities of scientific data which tend to be displayed as:

Two-dimensional data using a single shot-line of data and representing the intersection of two axes, one horizontal and one vertical;

Three-dimensional surveys which add a horizontal axis, creating the perception of depth and providing additional data points for a potentially more accurate geophysical survey.

Four-dimensional technology, which is made out of 3D readings of the same location over time but showing movements of subsurface hydrocarbons over time.

Four-component technology which measures sound waves both horizontally and vertically.

Regardless of how the acquired data is displayed, it will still be considered "raw" or "unprocessed" and, before it can be used it must go through a series of computerized processes. These processes—filtering, stacking, migrating and other computer analysis, make the data useable but require powerful computers to process complex algorithms through sophisticated computer programs. As computers have become more powerful and processing techniques more sophisticated, it has become common to re-process seismic data acquired in earlier years, creating new opportunities for exploration that could not originally be derived from it.

In most situations, the cross-spread land acquisition geometry has dense shots in the shot line direction and dense receiver in the receiver line direction, especially when the source lines and receiver lines are orthogonal. As such, common shot or common offset processing (including migration) are not optimal for these survey data points, and ends up requiring several more shots or offsets than the number of common spreads (also known in the art as super shots or super offsets). For fixed migration parameters, the efficiency of a beam migration for a fixed survey is inversely proportional to the number of beam centers or is proportional to the number of traces inside each beam centers.

3. Data Processing

Processing the acquired seismic input and land acquisition data over a survey region is typically done by geophysicists using special purpose computers typically comprising hybrid GPU/CPU processors. As such, the processing of these techniques are expensive, but they tend to be technically robust as they provide excellent results. However, a close association of the geophysicist, the data, and the processor is absolutely essential for the results to be useful. It is just that well logs, known depths, results from ancillary methods, custom formulas, algorithms, as well as the expected results all should be furnished to the computer system to process the data through a computer-implemented software program. This reduces the originally recorded data from the acquisition step (pre-stack data) into the data volumes (post-stack data) that are used for interpretation to locate hydrocarbon reservoirs in the subsurface of the earth.

There are many steps involved with the processing of data, that can be categorized into different classes:

1) Categorizing acquired data. This step assigns each trace to its common surface and subsurface location as well as shot to receiver distance and azimuth for example;
2) Time adjustments. This step compensates for travel time differences due to variations in surface topography and near surface geologic variations and source to receiver distance variations. These processes are commonly referred to as "statics" and "nmo or normal moveout".
3) Wavelet compression. This step collapses reflection events into a very short duration event instead of the original recorded signature. This is typically referred to as "Deconvolution" which has a variety of different technical implementations.
4) Noise Attenuation and signal to noise ratio improvements. This step removes as much noise as possible while retaining and enhancing as much of the primary signal as possible.
5) Adding (or stacking) traces that have a common subsurface reflection point.
6) Pre and/or post stack imaging. This step relocates all of the recorded samples and builds an image with the events of the image displayed at their proper positions in time (or depth) and space. Imaging, or migration, is one of the most complex and compute intensive steps in the processing sequence.
7) Other steps that can be used to extract more geologic information from the recorded seismic data to add more information to the interpretation step.

a. Data Regularization

The problem with any of the acquired data in seismic exploration is its irregularity therefore impacting its accuracy and relevancy. An issue that typically affects seismic surveying accuracy is overburden heterogeneity. This issue refers to a geological area getting overlaid in a model, with a target structure of interest (e.g., hydrocarbon reservoir) in the subsurface. As such, the overburden structure of interest will exhibit properties (e.g., velocity and density) that do not vary smoothly in the spatial and/or temporal sense. Instead, the overburden properties may vary rapidly, such as due to presence of rock fractures or harder and softer regions in the overburden. This often causes that exploration seismic data is usually confronted with irregular sampling along the spatial direction, spatial aliasing and low-resolution wave-equation-based migrations.

Several effective methods have been developed to regularize and interpolate the irregular seismic data, for example, wave-equation-based interpolation (Ronen J., 1987, Wave-equation trace interpolation, Geophys., vol. 52 (pg. 973-984)), prediction error filtering interpolation (Spitz S., 1991 Seismic trace interpolation in the f-x domain, Geophys., vol. 56 (pg. 785-794)), Fourier reconstruction (Sacchi M D, Ulrych T J., 1996, Estimation of the discrete Fourier transform, a linear inversion approach, Geophys., vol. 61 (pg. 1128-1136)), Seislet transform interpolation (Fomel S, Liu Y., 2010, Seislet transform and seislet frame, Geophys., vol. 75 (pg. V25-V38)), Radon transform (RT) regularization (Zhang Y, Lu W., 2014, 2D and 3D prestack seismic data regularization using an accelerated sparse time-invariant Radon transform, Geophys., vol. 79 (pg. V165-V177)), and nonlinear shaping regularization for a comprehensive interpolation framework (Chen Y, Zhang L, Mo L., 2015 Seismic data interpolation using nonlinear shaping regularization, J. Seism. Explor., vol. 24). Among those methods, RT-based regularization and interpolation have proved to be effective and robust, especially for prestack seismic data. The process of RT-based seismic data regularization is straightforward and flexible. The irregular spatial sampling data are transformed into the Radon panel and then transformed back to the regular spatial grid to reconstruct the regular seismic data. Nevertheless and no matter what regularization method is used, irregular data manifests differently based upon the model used:

When using Kirchhoff prestack migration, data irregularities often transform into image artifacts.

When performing multiple elimination, primary reflections are contaminated by multiples.

Common-azimuth migration might be rendered useless, as the use of this method implies that the input data is regularly spaced in midpoint and offset coordinates and therefore relies heavily on preprocessing by data regularization.

4-D seismic monitoring compares 3-D images from data collected at different production stages in order to monitor changes in the reservoir. It often requires data regularization onto a uniform grid for co-locating datasets with different acquisition geometries.

b. Gaussian Beam Migration

Kirchhoff migration has been the staple of prestack seismic imaging for over a decade. It allows time and depth migration methods to be incorporated within a single basic program, facilitates target-oriented migration, and enables straightforward migration velocity analysis. While the imaging accuracy of single-arrival Kirchhoff prestack depth migration has been sufficient for all but the most challenging structural imaging problems, accuracy comparisons with many wavefield extrapolation methods have often brought out its shortcomings. In particular, in complicated geology, where several arrivals are required to give a good image, we must choose one particular arrival, thereby degrading the image.

Recent developments in algorithms and their implementation in computer-implemented systems, have allowed wavefield extrapolation methods that can image events to become viable alternatives to Kirchhoff techniques. However, these methods can have problems imaging steep or overturned events, as well as accounting for anisotropy. Furthermore, although wavefield extrapolation methods can be affordable, they are still much more expensive than Kirchhoff migration. As a result, they are typically reserved for situations that really require multi-arrival imaging, such as geology below complicated salt bodies. One of said methods has been Gaussian Beam Migration which has been widely applied to the migration imaging (See Hill, N. R., 1990, *Gaussian beam migration*; Geophysics, v. 55, 1416-1428; and Hill, N. R., 2001, *Prestack Gaussian-beam depth migration*, Geophysics, v. 66, 1240-1250).

The Gaussian beam migration method has advantages over the Kirchhoff migration method, in areas of steep dip imaging, as well as caustics and multi-valued travel time. This method has then been exploited by scientific researchers, which ended up extending studies on the Gaussian beam migration, to anisotropic Gaussian beam migration, true-amplitude Gaussian beam migration, Gaussian beam reverse time migration, dynamically focused Gaussian beam migration and sparse Gaussian beam migration. Regardless of the method used, true Gaussian beam migration includes basically four steps: decomposing seismic data; representing the seismic data with Gaussian beams; propagating the Gaussian beams downward; and superposing, according to an imaging condition, contributions of the Gaussian beams at an imaging point. The decomposing the seismic data and representing the seismic data with Gaussian beams is the key factor for the Gaussian beam migration, which decides the computation amount and imaging results of the migration.

In the existing sparse Gaussian beam migration imaging method, sparse decomposition is applied to the seismic data by using Gaussian beams with a curvature of zero. But the seismic data has a curvature, and therefore, both a width of a Gaussian beam-based function and a spacing between centers of two adjacent Gaussian beams should be small enough to enable appropriate fitting of the seismic data. However, in the existing Gaussian beam migration imaging methods, a large number of waveform functions are obtained through decomposition, and it is required to perform migration imaging on each of the waveform functions during the migration of seismic imaging, and thus the computational efficiency of the entire migration is low.

In summary, the Gaussian beam migration imaging method retains the strengths of Kirchhoff migration, but can also image multiple arrivals. Although Hill, N. R., supra, gives the theoretical basis for Gaussian beam migration in his two classic papers, the method involves many steps and is difficult to implement. Indeed this is, perhaps, the main reason it has not become more popular. Gaussian Beam migration solves many of the imaging accuracy problems of single-arrival Kirchhoff migration, while retaining many of the advantages of the Kirchhoff method including its ability to image steeply dipping or overturned events, as well as imaging in the presence of TTI anisotropy.

Nevertheless, other beam migration methods have been used in the art. In particular, common offset beam migration (Rose Hill, 1996, 2001) and common shot beam migration (Samuel Gray, 2005) which are well known and widely used in the seismic production. Even with the obvious advantages these two other methods provide, few or none applications of common spread beam processing in the cross-spread acquisition, are mentioned for the seismic processing. In theory, the common spread beam migration significantly improves the signal to noise ratio and turn-around efficiency for the land depth processing. As cross-spread surveys in land acquisition proliferate, the demand for common-spread beam migration velocity model building and imaging also increases.

c. Ray Tracing

The concept of a ray tracing is very useful. It basically boils down to drawing a line in space that corresponds to the direction of the flow of radiant energy. Rays are a geometric idealization because they have no width. As such, a ray is a mathematical device rather than a physical entity. In practice, a person having ordinary skills in the art can produce very narrow beams (as, for example, a laser beam), and therefore a ray may then become the unattainable limit on the narrowness of such a beam. Similar to the lines of geometry, rays are a convenient fiction. They exist in the real world as a beam of light; and beams have width. In the same way, we may think of seismic rays as idealized beams in the direction of the flow of seismic energy.

The procedure for executing a ray equation is similar in geophysics as it is in optics. It basically comprises of solving wave equations that describe compressional waves traveling at the P-wave velocity of $\alpha$; shear waves which travel at the S-wave velocity of $\beta$; harmonic waves of frequency $\omega$ with constant amplitudes and zero initial phases. The formula can then be written for P-waves as:

$$\varphi(x,t) = \varphi_0(x) e^{-i\omega t} \qquad (1)$$

The concept of a ray describes the path of a wave packet through the isotropic medium, being at all times perpendicular to the wavefront in the direction of the increasing phase. Like the travel time T(x), which is defined as a time taken for wavefront to travel from a reference point $x_0$ to the arbitrary point x, the eikonal is defined relative to the phase at the reference point $S(x) = \alpha_0 T(x)$ and the eikonal equation can be re-written in terms of the travel time and the wave speed v(x):

$$(\nabla S)^2 = \frac{\alpha_0^2}{\alpha^2} 2 \Rightarrow (\nabla T)^2 = \frac{1}{v(x)^2} \qquad (2)$$

The ray path may then be described by the function x(s) where s is the curvilinear distance from the reference point along the ray path. Furthermore, the slowness vector p can then be defined as $p(s) = \nabla T$, because its magnitude at a point x(s) is equal to the reciprocal of the velocity at that point. Applying the condition that the ray path is orthogonal to the wavefronts yields:

$$\frac{dx}{ds} = v \nabla T = vp \qquad (3)$$

By differentiating the eikonal equation (2) with respect to s and combining the result with (3) the following (4) ray equation is obtained, and the travel times may then be calculated.

$$\frac{d}{ds}\left(\frac{1}{v}, \frac{dx}{ds}\right) = \nabla\left(\frac{1}{v}\right) \qquad (4)$$

Other ray tracing modeling programs exist as well, that are used by persons skilled in the art to obtain 2D or 3D models without an inversion stage. One of said programs is called RAYAMP (See Spence, G. D., 1983. *RAYAMP: An algorithm for tracing rays and calculating amplitudes in laterally varying media: program documentation*; Univ. of British Columbia), but requires that the user defines the velocity structure within a 2D model, with two types of boundaries: model and divider boundaries. A model boundary is a straight line of an arbitrary dip. It has assigned a constant velocity along its length and a nonzero velocity gradient normal to its length. A divider boundary is assigned a velocity zero and it separates two regions with different velocity and velocity gradient. Blocks may thus be defined, in which the velocity, magnitude and direction of velocity gradient are arbitrary. The ray path within a given block is considered by the program as a circular arc (because of constant velocity gradient), for which the travel time and the distance traveled may be calculated using very simple analytical expressions.

Another ray tracing program used by individuals skilled in the art is called JIVE3D (See James W D. Hobro; "*Jive3D*"; https://bullard.esc.cam.ac.uk; 2006). Modelling with JIVE3D is divided into forward and inversion modelling. At each iteration of the algorithm, a set of synthetic travel-time data is produced, from a working velocity model, and the Fréchet derivatives which link small changes in model parameters to small changes in travel-time data, are calculated. These synthetic data and Fréchet derivatives are then passed to the inversion stage, which compares the synthetic data with the given real data and calculates a new model based on a set of linear approximations until the model converges to a point that optimizes the specified norm for smoothness and best fit.

As such, given the current state of ray-tracing, not one solution can be used. In particular, RAYAMP can only used for 2D forward modelling, which means, that it cannot produce inversions to the starting model. If more realistic models are to be obtained with RAYAMP, a person having ordinary skills in the art would have to include some sort of algorithm for automatic search of the best set of parameters, which are defining the model, such as; different model boundaries, velocity field and smoothing criteria. The procedure of JIVE3D is more practical, as it includes inversion and is therefore able to construct the final model as an evolution of the starting model.

d. Summary

When imaging reservoirs beneath salt bodies or along steep flanks, conventional single-arrival ray-based technology (e.g. Kirchhoff migration) encounters serious problems as the imaging process is not able to reconstruct the scattered energy of the highly irregular (rugose) top salt, and information from waves that pass through the top of a salt mass is effectively lost (or only partially imaged). Beam migration (Hill, 1990, 2001) images the multi arrivals naturally, but also greatly reduces costs of following migrations for tomography iterations, if the dense data volume is decomposed to seismic elements and saved for future iterations. A laser beam migration approach limits the beam spread to a "laser-thin" region (Xiao et al., 2014), and can accommodate large lateral velocity variations to the accuracy of the central rays, while imposing no dip limitations on images.

Therefore, aiming at some defects of existing technology, the present embodiments of this invention introduces a new computer-implemented method and system employing compress-sensing model for migrating seismic over land-cross spreads.

SUMMARY OF THE INVENTION

The present invention discloses a novel method for locating a subsurface reflectors through common spread processing, specifically designed for cross-spread geometry. This method will have less numbers of common spreads than number of common shots or common offsets on a standard cross-spread land acquisition geometry; as it has been observed in the art that more traces inside each beam center lead to higher signal to noise ratio for the decomposition and less turn-around time for the migration. As such, a proposed embodiment of the present invention comprises common-spread beam migration as a superior method to common-shot/offset beam migration for a land cross-spread acquisition geometry, in terms of efficiency and quality.

The technique of embodiments of the invention, present the novel geophysics concept of compressed-sensing related to "downward continuations" as described in the art, but also referred to as an "extrapolation", which implies that there are not any directional constraints from the projection. Its objective is to simplify the time-consuming seismic processing done in the beam domain. More particularly, with compress-sensing, beam technology can decompose the dense data into sparse seismic elements and save for future seismic processing. The sparse beam elements are described by most important attributes including location, dips and wavelets, and capable of representing those complex/dense prestack dataset for following tomography and migration.

Therefore, objects of embodiments of the present invention, involve determining an efficient, accurate common spread beam migration method for land cross-spread acquisition geometry. In particular, objects of the present invention perform beam decomposing methods, while storing the sparse beam elements to a memory resource (e.g. disk), in order to reduce the computation time required for following seismic migration/stacking.

Further details, examples and aspects of the invention will be described below referring to the drawings listed in the following.

BRIEF DESCRIPTION OF THE DRAWINGS

The teachings of the present invention can be readily understood by considering the following description in conjunction with the accompanying drawings.

DETAILED DESCRIPTION OF THE INVENTION

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

Because land data acquisition may be performed on non-flat surfaces, sometimes mild or foothill topography, the shot and receiver lines are therefore not necessary straight, and often posed curved, in order to avoid obstacles on the land surface. As such, these conditions bring difficulties to the regularization stage prior to common-spread beam migration. Fortunately, with the proposed computer-implemented method and system, it is no longer needed to relate to a flat surface, but rather to relate to a smooth floating horizon. As long as, in a beam center, the topography is flat or smooth enough and the shot and receiver lines are straight or orthogonal enough, the impact of the topography and line weathering will be minimal to be ignored, after proper preprocessing are taking into account.

During land cross-spread acquisition geometry, it is typical to have dense shots, in both the shot line direction as well as in the receiver line direction, where the source lines and receiver lines are orthogonal. A common spread, $X_c$, from a cross-spread acquisition is defined as all the traces with the source at one shot line and receivers at one receiver line. After converting to local survey coordinates, within the present computer-implemented method one can have shot line coordinates $s_x$ as constant for each shot line, and receiver lines $g_y$ as constant for each receiver line, and the survey noted as XSG, and a common spread function identified as $X_c(s_x,g_y)$. Coordinates $s_y$ and $g_x$ are also constant for each shot line or receiver line respectively; while source slowness is then identified as $p_y^s$, while receiver slowness as $p_x^r$. In a super common spread, the source and receiver coordinates are inside a range in the source line or receiver line direction, instead of only a constant. This is useful for land acquisition with topography, and to further improve the efficiency and increase the signal to noise ratio. A common-spread beam migration is then defined as the process of first sorting the acquired data in common-spread domain, and then performing beam migration with corresponding slant stacking and imaging criteria, on one common spread input gather by one common spread.

Once the acquired data has been regularized, a process wherein data lost during regularization is recovered, gets initiated. Although multiple methods to achieve this exist, Compressed Sensing (CS) presents itself as a novel sensing/sampling paradigm that allows the recovery of sparse (few non-zeros) or compressible (quickly decaying entries) signals from far fewer measurements than the Nyquist rate. The sparsity assumption is easily realized in practice, as, for instance, natural images are sparse in the Wavelet domain (e.g. JPEG2000 compression) and seismic images are well represented in terms of curvelets. (See Candes, E., Romberg, J., and Tao, T., 2006, *Robust uncertainty principles: exact signal reconstruction from highly incomplete frequency information: Information Theory*, IEEE Transactions, 52, 489-509) and (Donoho, D., 2006, *Compressed sensing: Information Theory*, IEEE Transactions on, 52, 1289-1306) first provided rigorous theory underlining under which conditions a sparse signal could be recovered from subsampled measurements.

According to the compressed-sensing theory employed by the present computer-implemented method and system, successful dimensionality reduction hinges on an incoherent sampling strategy where coherent aliases are turned into relatively harmless white Gaussian noise. The challenges of adapting this approach to real-life problems in exploration seismology are threefold (See Herrmann, F. J., and Li, X., 2012, *Efficient least-squares imaging with sparsity promotion and compressive sensing*, Geophysical Prospecting, vol. 60, pp. 696-712). First, seismic data acquisition is subject to physical constraints on the placement, type, and number of (possibly simultaneous) sources, and numbers of receivers. These constraints in conjunction with the extremely large size of seismic data calls for approaches specific to the seismic case. Second, while CS offers significant opportunities for dimensionality reduction, there remain still challenges in adapting the scientific-computing workflow to this new approach, and again, CS offers an opportunity to make computation much more efficient. Third, seismic wavefields are highly multiscale, multidirectional, and are the solution of the wave equation. This calls for the use of directional and anisotropic transforms, e.g., curvelets Nevertheless, the present computer-implemented method and system uses compressed sensing algorithms for beam technology to decompose the dense data into sparse seismic elements and be saved to a memory resource, for future seismic processing. The saved sparse beam elements are described by their most important attributes including location, dips and wavelets, and capable of representing those complex/dense prestack dataset for post-processing tomography and migration. By simplifying the seismic processing in the beam domain, the time-consuming seismic post-processing (e.g. migration, stacking) can be greatly reduced to acceptable turnaround time.

Common offset beam migration and common shot beam migration are well known and widely used in the seismic production. Even with the obvious advantages, few or none applications of common spread beam processing in the cross-spread acquisition, are mentioned for the seismic processing. Thus the common spread beam migration method and system of the present invention processes the workflow by (1) sorting the acquired cross-spread data in to common-spread domain input gather; (2) reading in topography; (3) regularizing to flat surface or on topography; (4) decomposing to sparse beams; (5) raytracing; and (6) stacking. In particular, the computer-implemented method and system uses a dedicated migration kernel programmed in the non-transitory program computer device for stacking, in the following algorithm form:

```
For each common spread XSG{
    For each beam center location{
        Tapered local slant stacks
        For all image points in the aperture{
            Sum the slant-stacked input trace into the image using multi-
            arrival time-table.
        }End loop over image points
    }End loop over beam center location
}End loop over common spread
```

Nevertheless, a person having ordinary skills in the art, would soon realize that if the non-transitory program computer readable device wants to do more scanning on the input, the migration kernel algorithm is then executed in the alternative form of:

```
For each common spread XSG{
    For each beam center location{
        Tapered local slant stacks
        For each midpoint ray parameter{
            For each coarse-grid image point{
                Scan over offset ray parameters for the minimum value of
    imaginary time
            }End loop over coarse grid of image points
            For all image points in the aperture{
                Sum the slant-stacked input trace into the image using
                multi-arrival time-table.
            }End loop over image points
        }End loop over midpoint ray parameters
    }End loop over beam center location
}End loop over common spread
```

Figure 1:
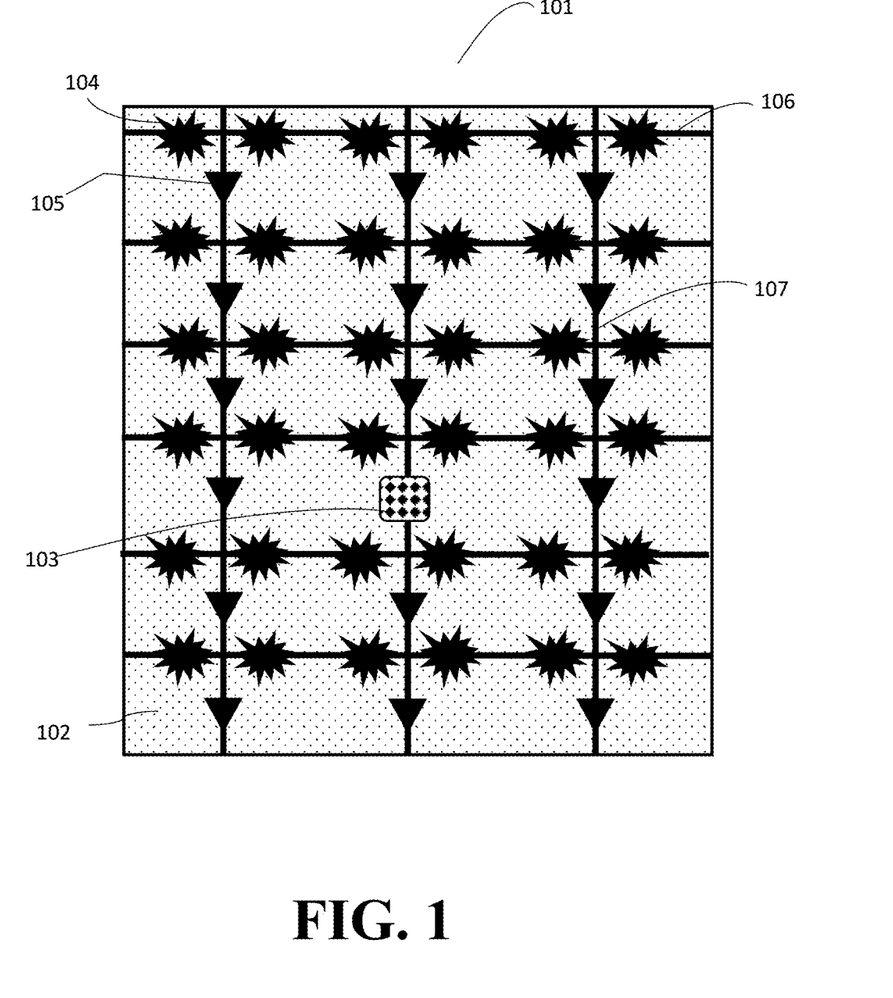
FIG. 1, is a schematic diagram showing top view of a survey region depicting a cross-spread acquisition geometry with receiver and shot lines, according to an embodiment of the present disclosure.

FIG. 1 illustrates a seismic survey region, 101, in which the preferred embodiment of the present invention is useful. It is important to note, that the survey region of FIG. 1 is a land-based region represented as 102 and that a complete survey plan, including swaths of shot (104) and receiver locations (105), as shown in FIG. 1 may vary depending upon survey characteristics like goals, budget, resource, and time.

Persons of ordinary skill in the art, will recognize that seismic survey regions like 101 produce detailed images of local geology in order to determine the location and size of possible hydrocarbon (oil and gas) reservoirs, and therefore a potential well location 103. Land acquisition geometry represented by FIG. 1 commonly is carried out by swath shooting in which receiver cables are laid out in parallel lines (inline direction) and shots are positioned in a perpendicular direction (crossline direction). In these survey regions, sound waves bounce off underground rock formations during blasts at various points of incidence or shots 104, and the waves that reflect back to the surface are captured by seismic data recording sensors, 105, transmitted by data transmission systems, 305, wirelessly, 303, from said sensors, 105, then stored for later processing, and analysis by the digital high performance computing system of FIG. 3. Although shots 104, are represented in FIG. 1 as a cross-spread pattern geometry with shot lines, 106 mostly running horizontally, a person having ordinary skills in the art, would soon realize that said pattern could easily be represented in other ways, such as vertically, diagonally or a combination of the three. Similarly, the recording sensors 105 are placed on receiver lines 107 shown running across the shot lines 106 but could've also been represented in other ways. The swath shooting method yields a wide range of source-receiver azimuths, which can be a concern during analysis by system computer 301. The source-receiver azimuth is the angle between a reference line, such as a receiver line or a dip line, and the line that passes through the source and receiver stations. Nevertheless, because of operating conditions, uniform coverage as shown in FIG. 1, usually is not achievable over the entire survey area with regards to FIG. 2, it illustrates a flow chart 201 with an overview of the preferred embodiment of the invention. The system acquiring phase 202 initiates the process by retrieving seismic model input data, 203, as well as land acquisition input data, 204, from the survey region 101. In particular, four different types of inputs are retrieved from as part of the land acquisition data of the survey region: upscaled well log data represented in time domain, a set of angle image gathers, horizons information, and seismic velocity data. Another set of data gathered by the present invention is seismic velocity. The acquired seismic velocity (both compressional and shear) is a fundamental input requirement of the proposed embodiment, as it comprises of material properties that vary with changes in conditions both external (stress, temperature) and internal (fluid saturation, crack density). As such, monitoring of changes in these external or internal conditions is a goal of geophysical investigations such as the one performed by the present embodiment as it helps with earthquake prediction (via stress change monitoring) and reservoir exploitation (via fluid saturation monitoring).

Figure 4:
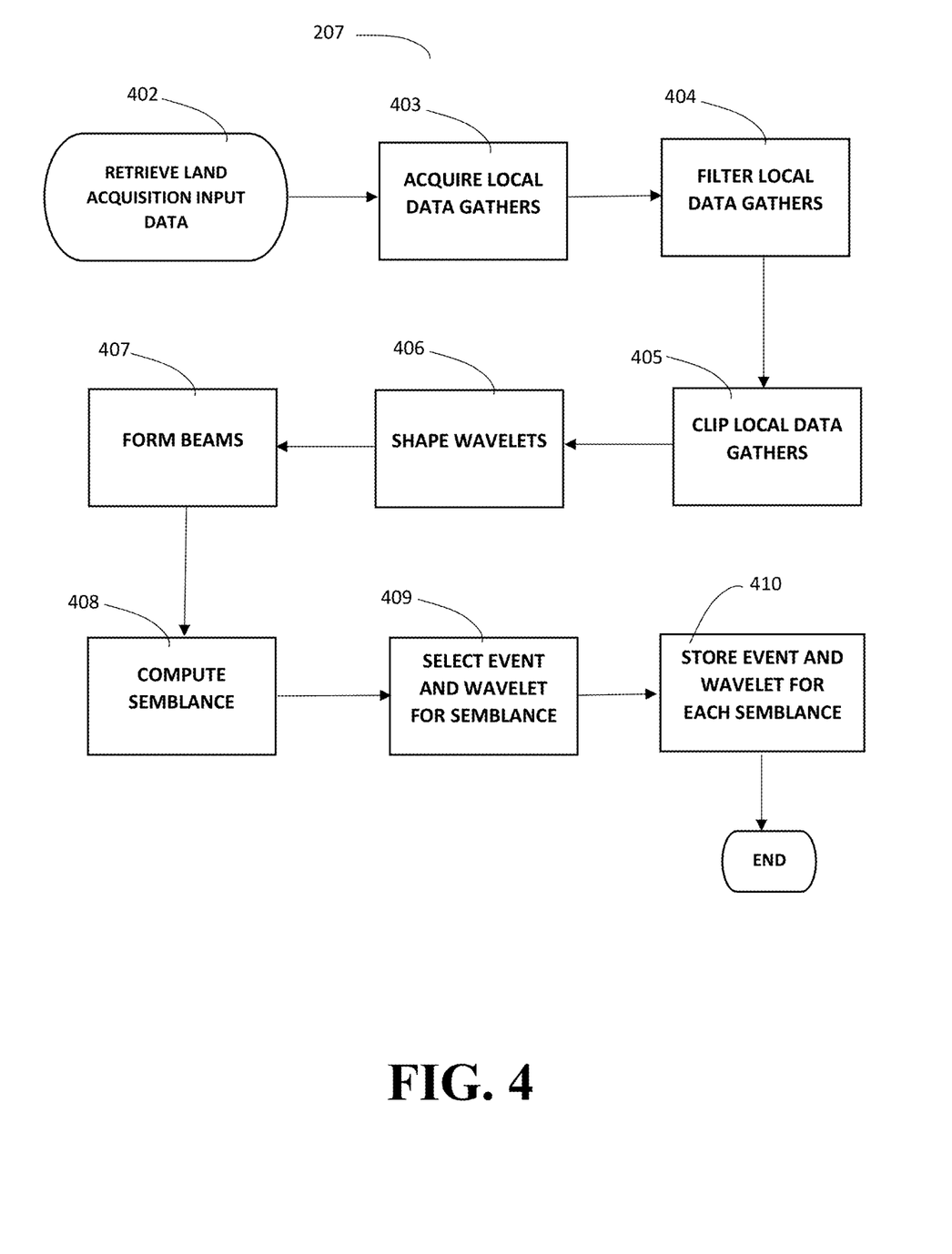
FIG. 4, illustrates a flow chart of the sub-routine of decomposing the retrieved seismic model input data into sparse common-spread beams for irregularly generated common-spread beam centers as executed by the non-transitory program computer readable memory storage device.

The seismic model input data may be obtained directly from the well location and remotely transferred onto a database, 304, for further processing, such as that contemplated on FIG. 4. It may also be retrieved from database 304, by the non-transitory program computer readable device 306. As such, the seismic model input data may comprise of P-wave velocity, S-wave velocity, density, a set of angle image gathers consistent with the amount of points of incidence 104 within a survey region 101 represented in the time or depth domain at the various angles of incidence. Nonetheless, since this seismic survey data 203 and 204 data is too raw, noisy, or from various points of incidence 104, it needs to be further processed. This further refinement occurs after the computer-implemented method stores to the memory resource, at 205, both of sets of acquired input data.

Figure 2:
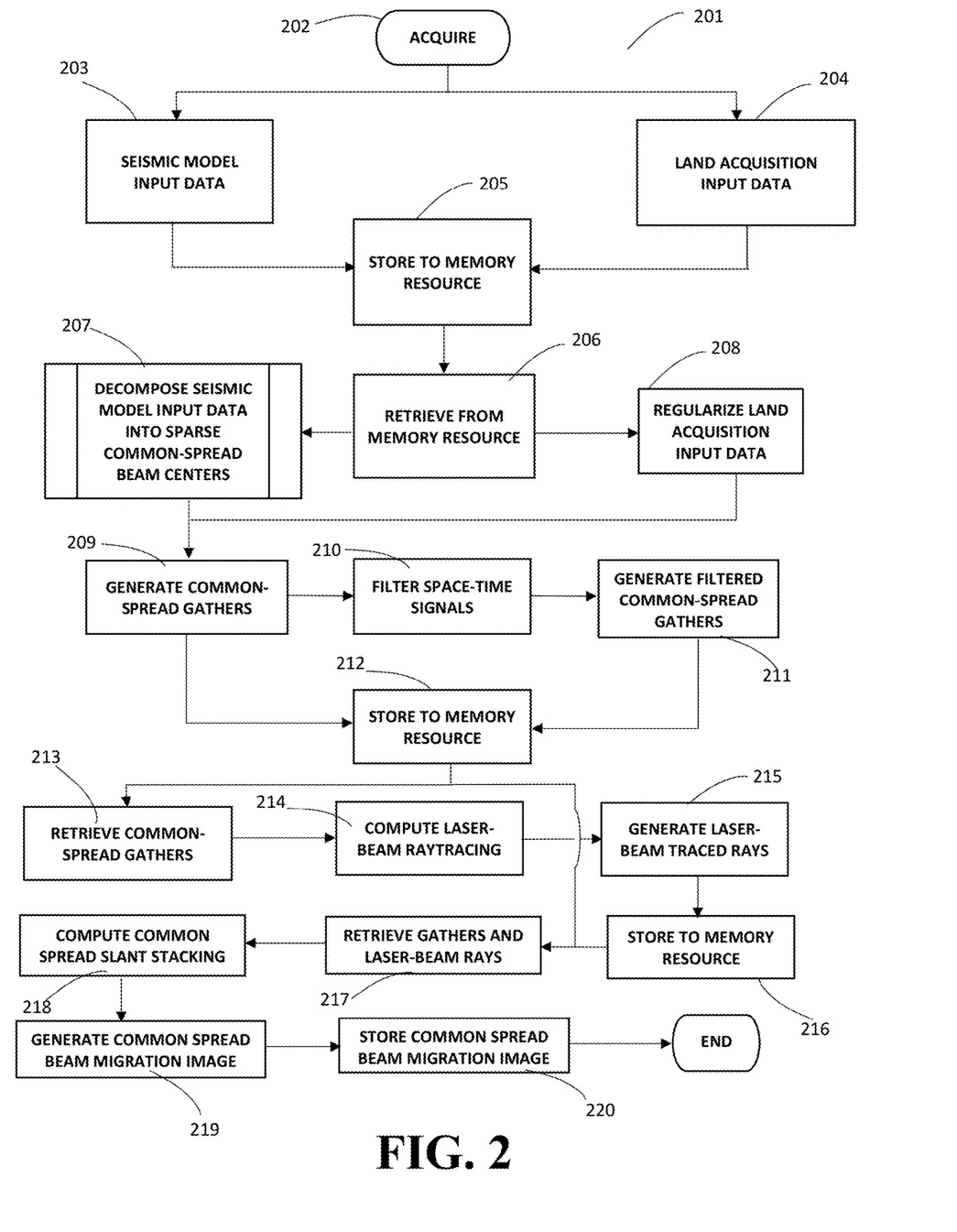
FIG. 2, is a flow chart showing the computer-implemented method for migrating seismic-over-land cross-spreads, according to an embodiment of the present disclosure.

The non-transitory computer program device 306 then receives a signal from the memory resources 304, indicating that the acquired data 203 and 204 have been stored and initiates a set of parallel operations which comprise of the sub-routine of decomposing the seismic model input data into spare common-spread beam centers, 207, as well as regularizing the land acquisition input data, 208. At which point, the system computer 301, then sends a message hook to the non-transitory program computer readable device, 306, to load both the decomposed seismic model input data from 207, as well as the regularized land acquisition input data, 208; to initiate routine 209 of generating common-spread gather. These generated common-spread gathers are then stored at 212 to the memory resource, 304. A common-spread gather refers to a group of prestack traces with a limited range of spread locations or spread location coordinates in between them. These traces, after decomposed, can contain some irregularities, that need to be addressed differently by the sub-routine. Non-transitory computer program device 306, will message the computer system device to indicate to the person having ordinary skills in the arts operating it, to make the determination as to whether the decomposed common-spread beam centers comprise of regular or irregular traces. The term "common spread gather" is often used for such trace gathers, even though the spread locations or spread coordinates within a gather do not have to be the same. A common-spread gather can be considered "valid" if it has a continuous coverage of the size of the whole survey, 2D or 3D. The word "continuous" is used in the sense that the pertinent data are sampled with the finest spatial rate of the survey. The word "valid" is used in the sense that such a gather, by itself, provides a continuous full-range subsurface image. This grouping of seismic data into common-spread gathers is a routine procedure for velocity analysis, prestack imaging and prestack data interpretation, such as AVO analysis.

Figure 3:
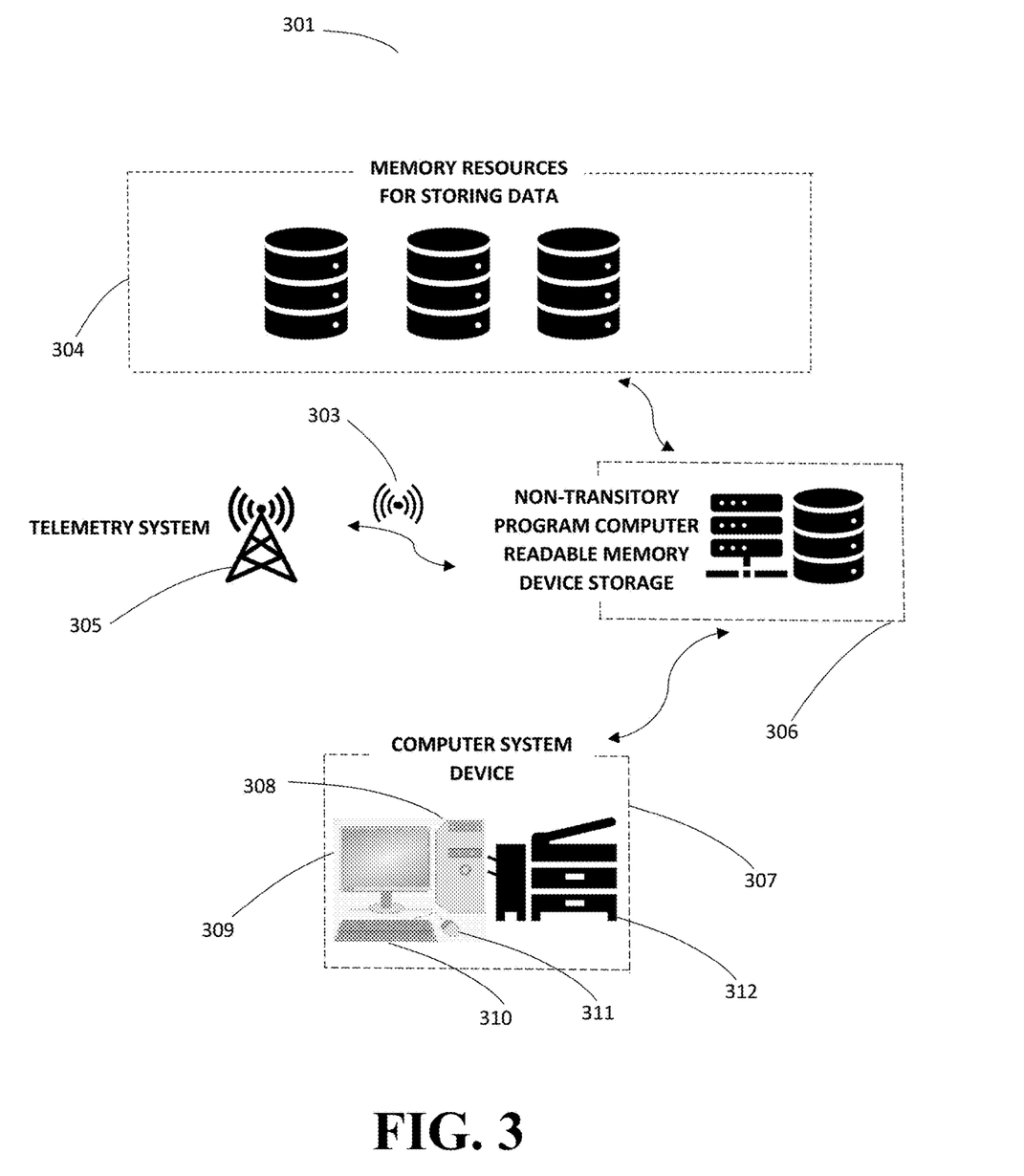
FIG. 3, is an electric diagram, in block form of the system apparatus programmed to perform the computer-implemented method for migrating seismic-over-land cross-spreads, according to an embodiment of the present disclosure.

The system computer 301, then sends a message hook to the non-transitory program computer readable memory device, 306, to initiate filtering routine 210 which filters the wave-bands as well as the accuracy/frequencies of the common-spread gathers, using well known algorithms of the art such as band pass, or low-pass filtering. This then triggers the non-transitory program computer readable memory device, 306, to message the computer system device 307 to display on monitor 309 whether the filtering was performed acceptably to a person having ordinary skills in the art. If the user or person of ordinary skills in the arts is not satisfied with the filtering 210, it then inputs a rejection command through the use of keyboard 310, and mouse 311 so that the computer system 307 can communicate with the non-transitory program computer readable memory device, 306 to performing filtering 210, using a different set of pre-programmed algorithm. This loop continues until the user or person having ordinary skills in the art inputs either by the use of keyboard 310 or mouse 311, that filtering 210 was acceptably performed. Upon confirmation of an acceptable filtering, the non-transitory program computer readable memory device, 306, generates a set of filtered common-spread gathers 211 that are then stored at 212, to the memory resource 304.

The system computer 301, then sends a message hook to the non-transitory program computer readable memory device, 306, to initiate the retrieval of the filtered common-spread beam centers at 213. Once retrieved, the non-transitory program computer readable memory device, 306 begins computing laser-beam raytracing 214 using velocity distribution, shooting or bending algorithms to trace the ray path from a point of incidence 104, to a receiver location 105. A ray tracing algorithm programmed in the non-transitory program computer readable memory device, 306 is used for forward modelling and applies seismic traveltime inversion with the purpose of determining the velocity model and interface structure. This algorithm is done for each ray in isotropic and vertical transversely isotropic (VTI) media. The main advantage of this algorithm (See also Zelt C. A. Smith R. B., 1992. *Seismic traveltime inversion for 2-D crustal velocity structure*; Geophysics; J. Int., vol. 108, pp. 16-34) is its flexibility in model parametrization and velocity determination. To obtain velocity model and interface structure, the programmed algorithm applies seismic refraction/wide-angle reflection traveltime calculations. The non-transitory program computer readable memory device, 306 generates at 215 the laser-beam traced rays, which are then stored to memory resource 304 at step 216. Once stored, the memory resource sends a message hook to the non-transitory program computer readable memory device 306, to retrieve at step 217 the common-spread gathers stored at 212 to the memory resource 304 as well as the traced laser-beam rays stored at 216. The non-transitory program computer readable memory device, 306 then computes common spread slant stacking at step 218, by applying linear moveout and summing amplitudes over the offset axis. An underlying assumption of the slant stacking step 218, is that of a horizontally layered earth model. Conventional processing is done primarily in midpoint-offset coordinates. Slant stacking replaces the offset axis with the ray parameter p axis, which is the inverse of the horizontal phase velocity, and non-transitory program computer readable memory device, 306 at step 219, begins computing the common-spread migration algorithm to generate common spread beam migration image. The image generated at 219, gets then store at step 220 into the memory resource 304, and the image displayed by the computer system's 307, monitor 309. The user may then print the migrated image generated at 219, or share the files with other computer-implemented programs for further processing or analysis.

As it pertains to FIG. 3, it illustrates a functional block diagram of a computer system apparatus, 301, used to perform an array of operations of the computer-implemented method 201 used for subsurface cave recognition in a survey region. The computer system apparatus, 301, further incorporates (wired and/or wirelessly) memory resources, 304, for storing data transmitted from the receiving sensors 105, using wireless transmission systems, 305, and transmitted wireless, 303, a non-transitory program computer readable memory device storage, 306, and a computer system device, 307.

The computer system device, 307, acts as a user interface the non-transitory program computer readable memory storage device, 306; to input, set, select, and perform the operations of retrieving, computing, generating, invoking, determining, converting, and correcting functions (the message hook procedures). Said computer system device, 307, is connected to (wired and/or wirelessly) to the non-transitory program computer readable memory storage device 306. The computer system device, 307, further includes other devices like a central processing unit (CPU), 308, a display or monitor, 309, a keyboard, 310, a mouse, 311, and a printer, 312.

The system computer device, 301, has firmware, a kernel and a software providing for the connection and interoperability of the multiple connected devices, like the memory resources for storing data, 304, the telemetry system 305, the non-transitory program computer readable memory device, 306, and the computer system device, 307. The system computer, 301, includes an operating system, a set of message hook procedures, and a system application.

Furthermore, because performance is the always important issue, the system computer device, 301, uses the non-transitory program computer readable memory device, 306 to ensure that the beam migration steps will not be bottle-necked by the system computer device 301 I/O, or any network communications. In fact, Apache Hadoop distributed file-system and proper data-compressions, as well as smart file caching according to the data will ensure that the computer-implemented method is only limited by the memory/cache speed and CPU computing power, and nothing else.

The operating system embedded within the system computer 301, may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of system computer 301 may, for example, represent an operation or command of the memory resources, 304, the computer system device, 307, the non-transitory program computer readable memory storage device, 306, which may be currently executing a certain step process or subroutine from the computer-implemented method for small cave recognition using seismic reflection data.

The set of message hook procedures may be first initiated by an input from: the user, like the entering of user-defined values or parameters; the manipulation of the computer system device, 307; the processing of operations in the non-transitory program computer readable memory device storage, 306; or automatically once certain data has been stored or retrieved by either the memory resources, 304, or the non-transitory program computer readable memory device storage, 306. Based on any of these inputs, processes or manipulation events, the memory resources, 304, the non-transitory program computer readable memory storage device, 306, or the computer system device, 307; generate a data packet that is passed to the system computer, 301, which are indicative of the event that has occurred as well as the event that needs to occur. When system computer, 301, receives the data packet, it converts it into a message based on the event, and executes the required step of the computer-implement method. The computer-implement method includes a set of message hook lists that identifies the series of message hook procedures. When the operating system receives the message, it examines the message hook list to determine if any message hook procedures have registered themselves with the operating system. If at least one message hook procedure has registered itself with the operating system, the operating system passes the message to the registered message hook procedure that appears first on the list. The called message hook executes and returns a value to the system computer, 301, that instructs the system computer, 301, to pass the message to the next registered message hook, and either 304, 306 or 307. The system computer, 301, continues executing the operations until all registered message hooks have passed, which indicates the completion of the method by the identification of magnetic inference 313.

According the preferred embodiment of the present invention, certain hardware, and software descriptions were detailed, merely as example embodiments and are not to limit the structure of implementation of the disclosed embodiments. For example, although many internal, and external components of the receiving system apparatus of FIG. 3 have been described, those with ordinary skills in the art will appreciate that such components and their interconnection are well known. Additionally, certain aspects of the disclosed invention may be embodied in software that is executed using one or more, receiving systems, computers systems devices, or non-transitory computer readable memory devices. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

As it pertains to FIG. 4, it illustrates a flow chart of the sub-routine 207 of decomposing the retrieved seismic model input data into sparse common-spread beams for irregularly generated common-spread beam centers as executed by the non-transitory program computer readable memory storage device, 306 with its output being the generation common-spread gather 209. The lack of regularity in beam centers, is mostly given by the acquisition of data through irregular magnetic micro-pulsations, as well as irregular topography. Thus, a person of ordinary skills in the art will recognize if the decomposed beam centers being generated are regularly or irregularly. Whatever the formation of the beam centers appears to be through the processing of the present embodiments, a person of ordinary skills in the art operating the system computer 301, will have to indicate to the non-transitory computer program device 306, through the use of computer system 307 whether the computer-implemented method continues the computation through the use regular or irregular common-spread beam forming. For regular beam forming during decomposing process 207, the sub-routine gets initiated by the non-transitory computer program device 306, after receiving command from the computer system device 307. The non-transitory computer program device 306, signals the memory resource 304, that it will begin retrieving at sub-step 402 the land acquisition input data 204. Once the non-transitory computer program device 306 has retrieved said data, it can begin acquiring local data gathers at step 403 Nonetheless, because the data is too raw to be processed, the local data gathers need to be filtered at step 404, using well-recognized algorithm in the art like low-pass, band-pass, waveforming, and others. Because seismic waves penetrate deep into the Earth providing key information to help detect geometric structures and physical characteristics of the Earth's interior, the understanding of high-resolution spatial complexities and deep Earth structures is limited by the number of seismic stations and the quality of the data they recorded. One fundamental solution is to increase the density of evenly distributed seismic stations (either permanent or temporary, on land or ocean bottom). But increasing station density is problematic because of the high costs of instrument deployment and maintenance. So instead, persons skilled in the art have implemented an array of clipping procedures to use data deployed by seismic stations and retrieved by sensors 105 A clipped waveform although a basic processing (e.g. band-pass filtering, and removing instrument response) it is still problematic because of the aliasing of the frequency components (also called frequency leakage), as it involves convolution or deconvolution that are basically frequency-based operations. To perform these basic processing procedures, it may be an alternative to select only the unclipped portions of the waveform, but this would require applying a damping taper function on the unclipped portions of the waveform that are close to the clipped portions, which causes additional waste of seismic data (usually 30 to 50 samples). The seismic records close to the epicenter convey much more valuable information of the earthquake source and the regional structures than data from stations further away. By definition, typically waveform amplitudes are larger closer to the shot epicenter 104 and therefore prone to be clipped. With the increasing density of seismic stations (especially for temporary seismic array), the computer-implemented method anticipates that the total number of clipped waveforms is only going to increase and therefore, performs the imperative step 405 of productively clipping data using max-clipping, min-clipping, taper-width, taper-shape, for later processing the zero-phase reshape wavelet. The seismic wavelet used by sub-routine 207, are the link between seismic data (traces) on which interpretations are based and the geology (reflection coefficients) that is being interpreted, and it must be known to interpret the geology correctly. However, it is typically unknown, and assumed to be both broad band and zero phase. Providing this broad band, zero phase wavelet is the processing goal of deconvolution. Unfortunately, this goal is rarely met and the typical wavelet that remains in fully processed land acquisition input data is mixed-phase. Differences in mixed-phase wavelets result in mis-ties and often incorrect interpretations. Therefore, sub-routine 207 assumes that the land acquisition input data contains a broad band—zero phase wavelet that is nearly always wrong, and performs the step of wavelet reshaping at 406 which results on mixed-phase wavelets remaining in fully processed seismic data. Beamforming is then performed at step 407 in order to filter spacetime signals from the processed wavelets. Step 407 is designed to isolate signals travelling in a particular direction, and use weighted delay and sum beamformer. The output of step 407, is the average of the linear combination of delayed signals. In other words, the beamformer output is formed by averaging weighted and delayed versions of receiver signals. The delay is chosen such that the passband of beamformer is directed to a specific direction in the space and then used to compute semblance at step 408. The step of computing semblance is used in the refinement of land acquisition input data. The use of this technique along makes it possible to greatly increase the resolution of the data despite the presence of background noise. Persons having ordinary skills in the art will soon recognize that the new data received following the semblance analysis is usually easier to interpret when trying to deduce the underground structure of an area. Weighted semblance can also be used by the non-transitory program computer readable memory storage device, 306, upon selection from the person having ordinary skills using the computer system device 307 for increasing the resolution of traditional semblance or make traditional semblance capable of analyzing more complicated seismic data. In the present embodiment, the computation of semblance utilizes the following algorithm:

$$D_{X_c}(X, p', \omega) = \left|\frac{\omega}{\omega_x}\right| \int\int \frac{dx'dy'}{4\pi^2} D_{X_c}(r', \omega) e^{\left[i\omega p'\cdot(r'-X) - \left|\frac{\omega}{\omega_x}\right|\frac{|r'-X|^2}{2\omega_x^2}\right]}; \quad (5)$$

Once the land acquisition input data 204 has been filtered, the non-transitory program computer readable memory storage device, 306 signals the computer system device 307, to display on monitor 309 the shot and receiver events, as well as each wavelet. The person having ordinary skills in the art, operating the computer system device 307, will soon realize from observing the display monitor 309, which events and wavelets are relevant from each semblance, and perform the step 409 of selecting them by using a combination of keyboard 310 and mouse 311 from the computer system device 307. Upon selection, the person of ordinary skills operating the computer system device 307, will be presented by a graphical user interface in monitor 309 asking to confirm selection. If selection is confirmed, then the computer system device 307 messages the non-transitory program computer readable memory storage device, 306 to store at 410, the selected event(s) and wavelet(s) for each semblance onto the memory resource 304. If the selection is not confirmed, the non-transitory program computer readable memory storage device, 306 presents the events and wavelets through the computer system's 307 monitor 309 again for selection. Once the selected event(s) and wavelet(s) is/are stored at 410, the system exits sub-routine and finalizes the generation of common-spread gather 209.

Figure 5:
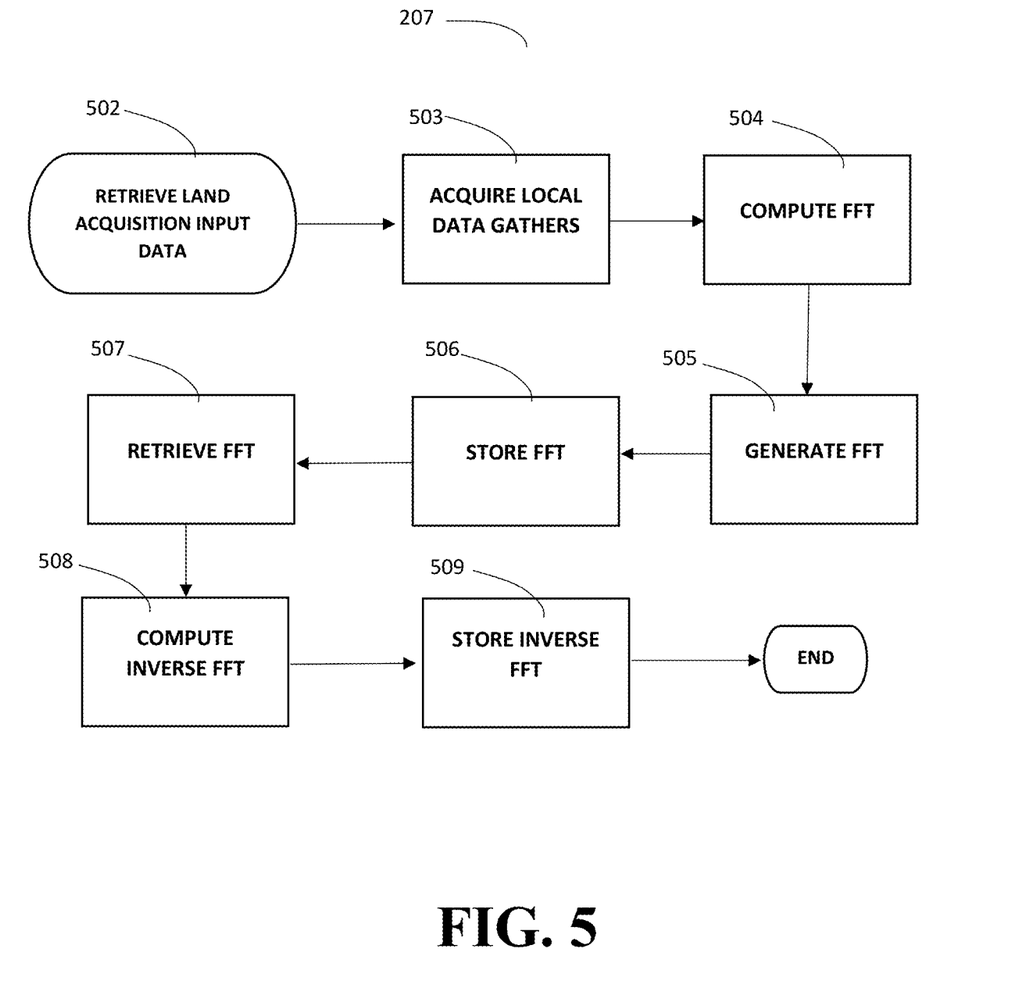
FIG. 5, illustrates a flow chart of the sub-routine of decomposing the retrieved seismic model input data into sparse common-spread beams for regularly generated common-spread beam centers as executed by the non-transitory program computer readable memory storage device.

Similarly, FIG. 5, illustrates a flow chart of the sub-routine 207 of decomposing the retrieved seismic model input data into sparse common-spread beams for regularly generated common-spread beam centers as executed by the non-transitory program computer readable memory storage device, 306 with its output being the generation common-spread gather 209. In the case of regularly generated common-spread beam centers, the process uses commonly known in the art method mainly comprising of Fast Fourier Transformations. Under the alternative or regularly formed beams, the non-transitory computer program device 306, signals the memory resource 304, that it will begin retrieving at sub-step 502 the land acquisition input data 204. Once the non-transitory computer program device 306 has retrieved said data, it can begin acquiring local data gathers at step 503. Once the local data gathers 503 have been acquired from the land acquisition input data 204, the non-transitory program computer readable memory storage device, 306, computes a Fast Fourier Transform analysis at 504, by extracting the series of sines and cosines and transforming from a function of time into a function of frequency. Furthermore, the Fast Fourier Transform (FFT) breaks up a transform of length N into two transforms of length N/2 using the identity sometimes called the Danielson-Lanczos lemma thereby reducing the computation resources needed for N points. The non-transitory computer program device 306, generates a Fast Fourier Transform at 505, and signals at 506 to the memory resource 304 that it will store the generated outcome 505. Upon successful completion of the FFT storage, the memory resource 304 signals the non-transitory computer program device 306, to begin the retrieval step 507, which will trigger the non-transitory computer program device 306, to begin computing the Inverse Fast Fourier Transform at 508. This transformation is a translation from the configuration space to frequency space and this is very important in terms of exploring both transformations of certain problems for more efficient computation and in exploring the power spectrum of a signal. Once the Inverse Fast Fourier Transform (IFFT) has been computed, the non-transitory computer program device 306, begins the process of storing the IFFT to the memory resource 304 for post processing during the decomposition and ultimately generating a common-spread gathers.

As used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

As used herein, the term "computing" encompasses a wide variety of actions, including calculating, determining, processing, deriving, investigation, look ups (e.g. looking up in a table, a database or another data structure), ascertaining and the like. It may also include receiving (e.g. receiving information), accessing (e.g. accessing data in a memory) and the like. Also, "computing" may include resolving, selecting, choosing, establishing, and the like.

As used herein, "subsurface", and "subterranean" means beneath the top surface of any mass of land at any elevation or over a range of elevations, whether above, below or at sea level, and/or beneath the floor surface of any mass of water, whether above, below or at sea level.

Unless specifically stated otherwise, terms such as "defining", "creating", "including", "representing", "pre-analyzing", "pre-defining", "choosing", "building", "assigning", "creating", "introducing", "eliminating", "re-meshing", "integrating", "discovering", "performing", "predicting", "determining", "inputting", "outputting", "identifying", "analyzing", "using", "assigning", "disturbing", "increasing", "adjusting", "incorporating", "simulating", "decreasing", "distributing", "specifying", "extracting", "displaying", "executing", "implementing", and "managing", or the like, may refer to the action and processes of a retrieving system, or other electronic device, that transforms data represented as physical (electronic, magnetic, or optical) quantities within some electrical device's storage, like memory resources, or non-transitory computer readable memory, into other data similarly represented as physical quantities within the storage, or in transmission or display devices.

Embodiments disclosed herein also relate to computer-implemented system, used as part of the retrieving system for performing the operations herein. This system may be specially constructed for the required purposes, or it may comprise a general-purpose computer selectively activated or reconfigured by a computer program or code stored in the memory resources, or non-transitory computer readable memory. As such, the computer program or code may be stored or encoded in a computer readable medium or implemented over some type of transmission medium. A computer-readable medium includes any medium or mechanism for storing or transmitting information in a form readable by a machine, such as a computer ('machine' and 'computer' may be used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable wired or wireless transmission medium, for transmitting signals such as electrical, optical, acoustical or other form of propagated signals (e.g., carrier waves, infrared signals, digital signals, etc.)).

A receiving system or sensor 105 as used herein, typically includes at least hardware capable of executing machine readable instructions, as well as the software for executing acts (typically machine-readable instructions) that produce a desired result. In addition, a retrieving system may include hybrids of hardware and software, as well as computer sub-systems.

Hardware generally includes at least processor-capable platforms, such as client-machines (also known as servers), and hand-held processing devices (for example smart phones, personal digital assistants (PDAs), or personal computing devices (PCDs)). Further, hardware may include any physical device that can store machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a retrieving system and are thus envisioned by the invention as possible equivalent structures and equivalent methods.

Computer-readable mediums or memory resources include passive data storage, such as a random-access memory (RAM) as well as semi-permanent data storage such as external hard drives, and external databases, for example. In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

The system computer may be designed to work on any specific architecture. For example, the system may be executed on a high-performance computing system, which typically comprise the aggregation of multiple single computers, physically connected, or connected over local area networks, client-server networks, wide area networks, internets, hand-held and other portable and wireless devices and networks.

An "output device" includes the direct act that causes generating, as well as any indirect act that facilitates generation. Indirect acts include providing software to an user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

A database, or multiple databases may comprise any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the a local network, a wireless network of the Internet.

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined Additionally, the flowcharts and block diagrams in the Figures illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For examples, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

Symbols Table

| Symbol | Brief Definition |
| --- | --- |
| $\varphi$ | A curl-free scalar potential |
| $\varkappa$ | Arbitrary point location |
| t | Time |
| $\omega$ | Harmonic waves of frequency |
| S | Eikonal |
| $\alpha$ | P-wave velocity |
| T | Travel Time |
| v and v' | Velocity |
| x | Location |
| $D_{X_c}(X, p', \omega)$ | Decomposed Tau-P data from common spread data |
| X | Common spread beam center |
| p' | Slowness |
| r' | Trace location |
| $D_{X_c}(r', \omega)$ | Recorded wavefield |
| $X_c$ | Common Spread |
| $C_0$ | Constant value |
| $l_{X_c}(r)$ | Common spread $X_c$ migration image at r location. |

I claim:

1. A computer-implemented method that employs compress-sensing models to migrate seismic over land-cross spreads to reveal a location and amplitude of a target subsurface hydro-carbonate using prestack seismic data acquired in a survey region, the computer-implemented method comprising
acquiring seismic model input data and land acquisition input data from the survey region;
storing the seismic model input data and the land acquisition input data to a memory resource;
retrieving the seismic model input data and the land acquisition input data from the memory resource;
regularizing the land acquisition input data by employing either flat surface or floating horizon algorithms;
decomposing the seismic model input data into sparse common-spread beam centers;
generating common-spread gathers from the sparse common-spread beam centers;
filtering space-time signals from the common-spread gathers sharing the regularized land acquisition input data;
generating filtered common-spread gathers from the filtered space-time signals;
storing the common-spread gathers and the filtered common-spread gathers to the memory resource;
retrieving the common-spread gathers from the memory resource;
computing laser-beam raytracing for each common-spread gather;
generating laser-beam traced rays from the laser-beam raytracing;
storing the laser-beam traced rays to the memory resource;
retrieving the common-spread gathers and the laser-beam traced rays from the memory resource;
computing common spread slant stacking for each retrieved common-spread gather and laser-beam traced ray;
generating a common spread beam migration image from the common spread slant stacking; and
storing the common spread beam migration image to the memory resource.

2. The computer-implemented method of claim 1, wherein the seismic model input data further comprises common cross-spread trace recordings of wavefields, seismic amplitudes, and seismic travel-times.

3. The computer-implemented method of claim 1, wherein the land acquisition input data further comprises common vector and azimuth offset gathers, common shot gathers, common receiver gather, shot line coordinates, receiver line coordinates, source slowness, and receiver slowness.

4. The computer-implemented method of claim 1, wherein decomposing the seismic model input data into the sparse common-spread beams further comprises generating irregular beam centers or regular beam centers.

5. A computing system for performing a computer-implemented method that employs compress-sensing models to migrate seismic over land-cross spreads to reveal a location and amplitude of a target subsurface hydro-carbonate using prestack seismic data acquired in a survey region, the computing system comprising:
a telemetry system for sending and receiving seismic model input data and land acquisition input data from the survey region;
a memory resource for storing data corresponding to operations of computing and generating
a computer system output device; and
a non-transitory computer readable memory device coupled to the telemetry system, coupled to the memory resource, and coupled to the computer system output device, the non-transitory computer readable memory device programmed for performing the operations of:
acquiring the seismic model input data and the land acquisition input data from the survey region;
storing the seismic model input data and the land acquisition input data to the memory resource;
retrieving the seismic model input data and the land acquisition input data from the memory resource;
regularizing the land acquisition input data by employing either flat surface or floating horizon algorithms;
decomposing the seismic model input data into sparse common-spread beam centers;
generating common-spread gathers from the sparse common-spread beam centers;
filtering space-time signals from the common-spread gathers sharing the regularized land acquisition input data;
generating filtered common-spread gathers from the filtered space-time signals;

storing the common-spread gathers and the filtered common-spread gathers to the memory resource;
retrieving the common-spread gathers from the memory resource;
computing laser-beam raytracing for each common-spread gather;
generating laser-beam traced rays from the laser-beam raytracing;
storing the laser-beam traced rays to the memory resource;
retrieving the common-spread gathers and the laser-beam traced rays from the memory resource;
computing common spread slant stacking for each common-spread gather and laser-beam traced ray;
generating a common spread beam migration image from the common spread slant stacking; and
storing the common spread beam migration image to the memory resource.

6. The computing system of claim 5, wherein decomposing the seismic model input data into the sparse common-spread beam centers generates irregular or regular common-spread beams.

7. The computing system of claim 5, wherein the non-transitory computer readable memory device is further programmed to perform the operations of decomposing the seismic model input data into the sparse common-spread beams for irregularly generated common-spread beam centers by:
retrieving the land acquisition input data from the memory resource;
acquiring local data gathers from the land acquisition input data;
filtering the local data gathers;
clipping the filtered local data gathers to generate clipped gathers;
shaping wavelets from the clipped gathers;
forming beams from the shaped wavelets;
computing semblance on the formed beams;
selecting an event and a wavelet for the semblance; and
storing the event and the wavelet.

8. The computing system of claim 5, wherein the non-transitory computer readable memory device is further programmed to perform the operation of decomposing the seismic model input data into the sparse common-spread beams for irregular generated common-spread beam centers, by solving an expression, wherein the expression has variables of Harmonic waves of frequency, trace location, and recorded wavefield.

9. The computing system of claim 5, wherein the non-transitory computer readable memory device is further programmed to perform operation of decomposing the seismic model input data into the sparse common-spread beams for regular generated common-spread beam centers, by:
retrieving the land acquisition input data from the memory resource;
acquiring local data gathers from the land acquisition input data;
computing a Fast Fourier Transformation on the local data gathers;
generating Fast Fourier Transformed regular common-spread beam centers from the Fast Fourier Transformation;
storing the Fast Fourier Transformed regular common-spread beam centers;
retrieving the Fast Fourier Transformed regular common-spread beam centers;
computing an Inverse Fast Fourier Transformation on the Fast Fourier Transformed regular common-spread beam centers to generate Inverse Fast Fourier Transformation regular beam centers; and
storing the Inverse Fast Fourier Transformation regular beam centers.

* * * * *